United States Patent
Delle-Vedove et al.

(10) Patent No.: US 10,627,252 B2
(45) Date of Patent: Apr. 21, 2020

(54) DEVICE, SYSTEM AND METHOD FOR ASSISTING A PILOT OF AN AIRCRAFT

(71) Applicant: Airbus SAS, Blagnac (FR)

(72) Inventors: Lionel Delle-Vedove, Bruguieres (FR); Simon Szydlowski, Cornebarrieu (FR)

(73) Assignee: Airbus SAS, Blagnac (FR)

( * ) Notice: Subject to any disclaimer, the term of this patent is extended or adjusted under 35 U.S.C. 154(b) by 93 days.

(21) Appl. No.: 15/949,487

(22) Filed: Apr. 10, 2018

(65) Prior Publication Data

US 2018/0292231 A1 Oct. 11, 2018

Related U.S. Application Data

(60) Provisional application No. 62/484,232, filed on Apr. 11, 2017.

(30) Foreign Application Priority Data

Jun. 8, 2017 (FR) ...................... 17 55099

(51) Int. Cl.
*B64D 43/00* (2006.01)
*B64D 45/00* (2006.01)
*G01C 23/00* (2006.01)
*G07C 5/08* (2006.01)
*G08G 5/00* (2006.01)

(52) U.S. Cl.
CPC ........... *G01C 23/005* (2013.01); *B64D 43/00* (2013.01); *B64D 45/00* (2013.01); *G07C 5/08* (2013.01); *B64D 2045/0075* (2013.01); *G07C 5/0816* (2013.01); *G08G 5/003* (2013.01)

(58) Field of Classification Search
None
See application file for complete search history.

(56) References Cited

U.S. PATENT DOCUMENTS

| 8,665,121 | B2 | 3/2014 | Shavit | |
|---|---|---|---|---|
| 8,768,534 | B2 * | 7/2014 | Lentz | G05D 1/00 |
| | | | | 701/1 |
| 9,440,748 | B1 * | 9/2016 | Lentz | G06F 16/284 |
| 9,563,580 | B2 * | 2/2017 | Warner | G06F 13/10 |

(Continued)

FOREIGN PATENT DOCUMENTS

EP 2660563 6/2013

OTHER PUBLICATIONS

Search report for French application No. FR 1755099, dated Feb. 20, 2018, priority document.

*Primary Examiner* — Joshua E Rodden
(74) *Attorney, Agent, or Firm* — Greer, Burns & Crain Ltd.

(57) ABSTRACT

A device, system, and method for assisting a pilot of an aircraft. The device includes a processing unit which: acquires flight parameters of the aircraft, transmitted by a communications unit of the aircraft and records these flight parameters in a memory of the pilot assistance device; acquires behavioral information corresponding to a model of behavior of the aircraft, transmitted by a ground station, and records this behavioral information in the memory of the pilot assistance device; determines an indicator of the quality of flying of the aircraft as a function of at least a portion of the flight parameters recorded in the memory and of at least a portion of the behavioral information recorded in the memory; and control the display of the flying quality indicator.

8 Claims, 2 Drawing Sheets

(56) References Cited

U.S. PATENT DOCUMENTS

| | | | |
|---|---|---|---|
| 9,564,056 B1* | 2/2017 | Ghaemi | G08G 5/0095 |
| 9,745,077 B1* | 8/2017 | Lentz | B64D 45/00 |
| 9,911,339 B2* | 3/2018 | Lax | G06F 17/50 |
| 2012/0265372 A1* | 10/2012 | Hedrick | H04L 67/36 |
| | | | 701/3 |
| 2013/0124018 A1* | 5/2013 | Lentz | G05D 1/00 |
| | | | 701/3 |
| 2013/0190950 A1 | 7/2013 | Shukla | |
| 2013/0289804 A1 | 10/2013 | Tucker | |
| 2014/0152792 A1* | 6/2014 | Krueger | A61M 21/00 |
| | | | 348/78 |
| 2014/0257602 A1 | 9/2014 | Gaston | |
| 2014/0343765 A1* | 11/2014 | Suiter | G08G 5/0056 |
| | | | 701/18 |
| 2015/0032296 A1* | 1/2015 | Girard | G07C 5/008 |
| | | | 701/3 |
| 2017/0297582 A1* | 10/2017 | Rosing | B60W 40/08 |

\* cited by examiner

DEVICE, SYSTEM AND METHOD FOR ASSISTING A PILOT OF AN AIRCRAFT

RELATED APPLICATIONS

This invention claims priority to U.S. Provisional Patent Application Ser. No. 62/484,232 filed on Apr. 11, 2017 and French Patent Application No. 17 55099 filed on Jun. 8, 2017, the entirety of both of which are incorporated herein by reference.

FIELD OF THE INVENTION

The invention relates to the field of the flying of aircraft by pilots. When flying an aircraft, for example a transport airplane, a pilot is apt to take decisions which have an impact on the quality of the flight of the aircraft. This quality relates for example to the fuel consumption, to the noise generated on approach to an airport, to the optimization of the taxiing time on a runway, etc. It would be advantageous for a pilot to be able to appreciate the quality of his/her flying technique in order to be able to improve it, if necessary.

Aircraft comprise an assembly of computers, referred to as avionics computers, responsible for controlling their operation. This assembly of computers generally comprises a flight management computer of the FMS (for "Flight Management System") type, a flight control computer, for example of the FCS (for "Flight Control System") type or of the PRIM (for "PRIMary Computer") and SEC (for "SECondary Computer") types, a maintenance computer of the CMC (for "Central Maintenance Computer") type, an alarm management computer of the FWS (for "Flight Warning System") type, etc. The avionics computers generally furthermore comprise a system for monitoring flight information on the aircraft, for example of the ACMS (for "Aircraft Condition Monitoring System") type. This flight information on the aircraft may correspond to data coming from sensors or other equipment of the aircraft, for example current performance characteristics of the aircraft, information on speed of the aircraft, information relating to the operation of the engines of the aircraft (temperature, etc.), etc. A system of the ACMS type is configured for producing reports corresponding to a predetermined set of information on the aircraft. The system of the ACMS type may furthermore be configured for sending these reports to a ground station, generally by means of a communication of the ACARS (for "Aircraft Communications Addressing and Reporting System") type. These reports are used to facilitate fault finding and the maintenance of the aircraft, but they do not allow the quality of flying of a pilot to be evaluated.

BRIEF DESCRIPTION OF THE INVENTION

The aim of the present invention is notably to provide a solution to these problems. It relates to a pilot assistance device of an aircraft, the device comprising a processing unit and a memory. The device is noteworthy in that the processing unit is configured for:

during at least one flight phase of the aircraft, acquiring flight parameters of the aircraft, transmitted by a communications unit of the aircraft via a communications link between the communications unit and the pilot assistance device and recording these flight parameters in the memory of the pilot assistance device;

acquiring behavioral information corresponding to at least one model of behavior of the aircraft, transmitted by a ground station via a communications link between the ground station and the pilot assistance device and recording this behavioral information in the memory of the pilot assistance device;

determining at least one indicator of the quality of flying of the aircraft as a function of at least a part of the flight parameters recorded in the memory and of at least a part of the behavioral information recorded in the memory; and controlling the display of the said at least one flying quality indicator.

Thus, the pilot assistance device automatically determines an indicator of the quality of flying of the aircraft by the pilot and it sends a command to display the indicator. The pilot can therefore be made aware of the quality of his/her flying of the aircraft, which subsequently allows him/her to improve his/her performance.

Advantageously, the pilot assistance device is a portable device that is independent of the avionics systems of the aircraft.

According to particular embodiments which may be taken into account in isolation or in combination:

the processing unit is configured for determining the flying quality indicator by comparison of the said part of the flight parameters recorded in the memory with a model of behavior of the aircraft corresponding to the said part of the behavioral information recorded in the memory;

the processing unit is furthermore configured for determining an action of the pilot which would have allowed the flying quality indicator to be optimized and for controlling the display of a recommendation corresponding to the said action of the pilot;

the processing unit is furthermore configured for, during at least one flight phase of the aircraft, acquiring physical parameters of the pilot, transmitted by a portable device that is independent of the pilot assistance device via a communications link between this portable device and the pilot assistance device and recording these physical parameters of the pilot in the memory of the pilot assistance device;

the processing unit is furthermore configured for:

acquiring decision information corresponding to at least one decision tree, transmitted by a ground station via a link between the ground station and the pilot assistance device and recording this decision information in the memory of the pilot assistance device;

determining whether a predetermined event has occurred, as a function of at least a part of the flight parameters recorded in the memory and of at least a part of the decision information recorded in the memory;

causing the generation of a notification on a portable device that is independent of the pilot assistance device, if the predetermined event has occurred.

In particular, the event corresponds to one of the following events:

the occurrence of an environmental condition;

the occurrence of a physical condition of the pilot; or the non-implementation of an expected action of the pilot.

the processing unit is furthermore configured for transmitting the flight parameters recorded in the memory of the pilot assistance device to the ground station, via a communications link between the ground station and the pilot assistance device.

The invention also relates to a system for assisting a pilot of an aircraft. This system is noteworthy in that it comprises:

the said aircraft comprising a communications unit;

a ground station configured for transmitting behavioral information corresponding to at least one model of behavior of the aircraft;

a pilot assistance device, according to any one of the preceding claims.

The invention also relates to a method for assisting a pilot of an aircraft. This method is noteworthy in that it comprises the following steps implemented by a processing unit of a pilot assistance device:

during at least one flight phase of the aircraft, acquire flight parameters of the aircraft, transmitted by a communications unit of the aircraft via a communications link between the communications unit and the pilot assistance device and record these flight parameters in a memory of the pilot assistance device;

acquire behavioral information corresponding to at least one model of behavior of the aircraft, transmitted by a ground station via a communications link between the ground station and the pilot assistance device and record this behavioral information in the memory of the pilot assistance device;

determine at least one indicator of the quality of flying of the aircraft as a function of at least a part of the flight parameters recorded in the memory and of at least a part of the behavioral information recorded in the memory; and control the display of the said at least one flying quality indicator.

The invention also relates to a non-volatile medium readable by a computer for assisting a pilot of an aircraft, the medium being characterized in that it stores instructions which, when they are executed by a processing unit of the computer, cause the processing unit of the computer to implement the following steps:

during at least one flight phase of the aircraft, acquire flight parameters of the aircraft, transmitted by a communications unit of the aircraft via a communications link between the communications unit and the pilot assistance computer and record these flight parameters in a memory of the pilot assistance computer;

acquire behavioral information corresponding to at least one model of behavior of the aircraft, transmitted by a ground station via a communications link between the ground station and the pilot assistance computer and record this behavioral information in the memory of the pilot assistance computer;

determine at least one indicator of the quality of flying of the aircraft as a function of at least a part of the flight parameters recorded in the memory and of at least a part of the behavioral information recorded in the memory; and control the display of the said at least one flying quality indicator.

BRIEF DESCRIPTION OF THE DRAWINGS

The invention will be better understood upon reading the description that follows and upon examining the appended figures.

DETAILED DESCRIPTION OF EMBODIMENTS OF THE INVENTION

Figure 2:
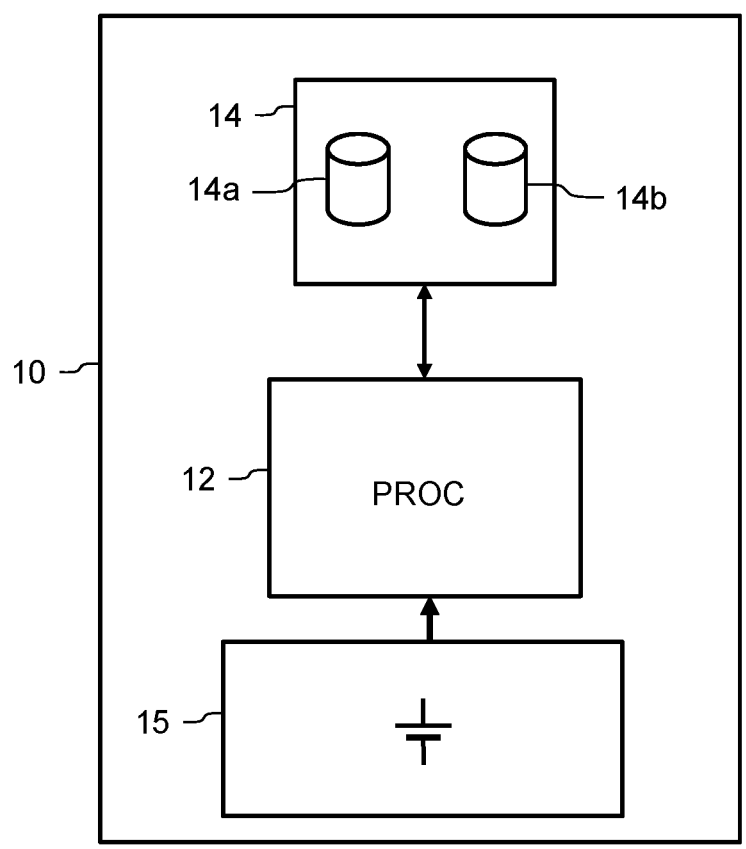
FIG. 2 shows schematically a pilot assistance device, according to one embodiment of the invention.

The device 10 for assisting a pilot, shown in FIG. 2, comprises a processing unit 12, labelled PROC in the figure. This processing unit comprises a processor, for example a microprocessor or a microcontroller. The device 10 also comprises a memory 14 connected to the processing unit. According to one alternative, the memory 14 comprises several memory areas 14a, 14b of the same physical memory. According to another alternative, the memory 14 corresponds to an assembly of separate physical memories 14a, 14b connected to the processing unit 12. According to a first variant, the physical memory or memories correspond for example to memory cards, such as for example cards of the SD type. According to another variant, the physical memories are directly integrated into the device 10. Preferably, the device 10 is a portable device incorporating a battery 15 providing its electrical power supply. The device 10 then corresponds for example to a tablet, to a smartphone or else to a portable computer of the EFB (for "Electronic Flight Bag") type.

Figure 1:
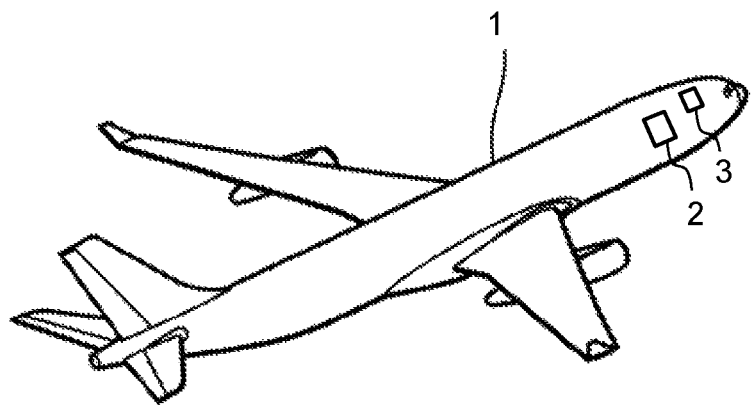
FIG. 1 illustrates an aircraft capable of carrying an onboard pilot assistance device, according to one embodiment of the invention.
Figure 4:
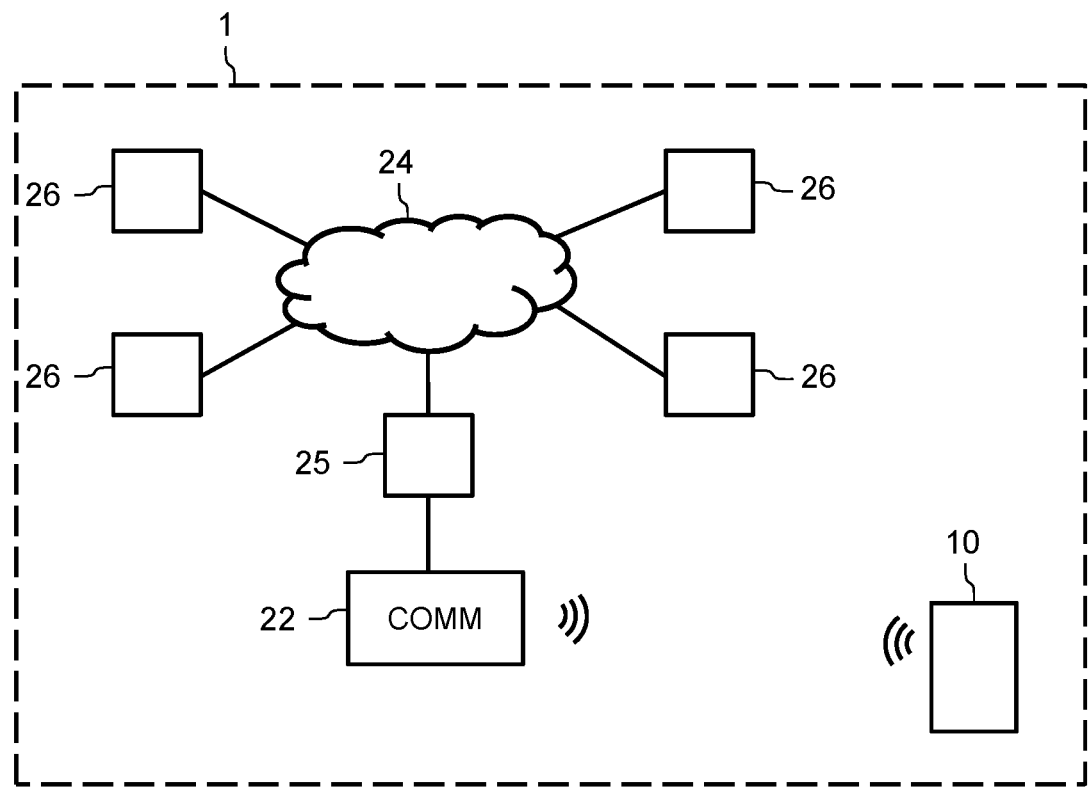
FIG. 4 illustrates schematically a pilot assistance device, in communication with a communications unit of an aircraft.

The pilot assistance device 10 is designed to be carried on board an aircraft such as, for example, the aircraft 1 shown in FIG. 1. For example, the device 10 is then located in a cockpit 3 of the aircraft, close to the pilot. The processing unit 12 of the pilot assistance device 10 is configured for communicating with a communications unit 22 of the aircraft via a communications link between the communications unit 22 and the pilot assistance device 10, as shown in FIG. 4. Advantageously, the said communications link is a wireless communications link, for example of the WiFi type. The communications unit 22 is also connected to an avionics network 24 of the aircraft, for example but not necessarily via an avionics computer 25. The avionics network 24 allows several avionics computers 25, 26 of the aircraft to be connected together. These avionics computers are for example situated in an avionics rack 2 of the aircraft. According to one exemplary embodiment, the avionics network 24 is a deterministic switched Ethernet network conforming to the standard ARINC 664 part 7. According to another exemplary embodiment, the avionics network 24 conforms to the standard ARINC 429. In one embodiment, the computer 25 is a computer for acquiring parameters of the aircraft, for example of the FDIMU (for "Flight Data Interface Management Unit") type or of the DFDAU (for "Digital Flight Data Acquisition Unit") type. The communications unit 22 is configured for acquiring flight parameters of the aircraft coming from the computer 25 or from other avionics computers 26, and for transmitting these flight parameters over the communications link between the communications unit 22 and the pilot assistance device 10.

Figure 3:
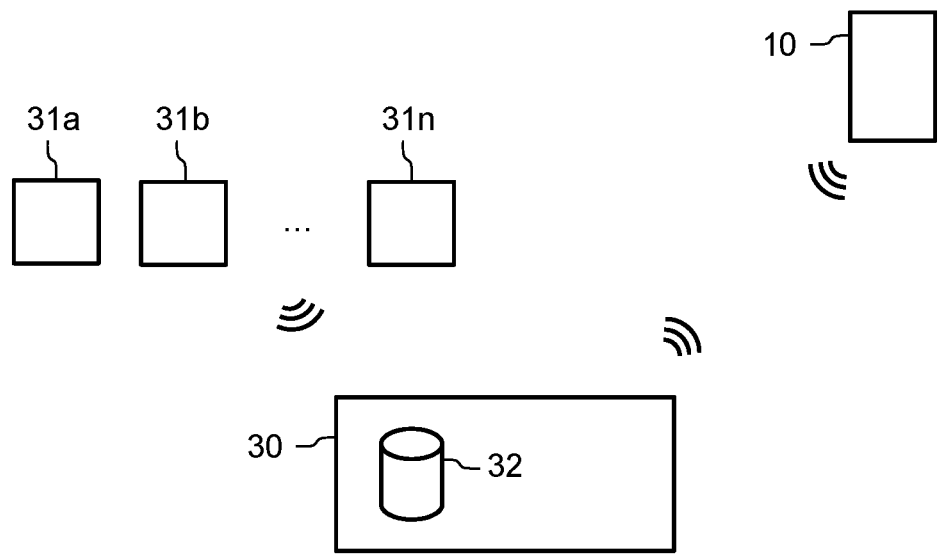
FIG. 3 illustrates schematically a pilot assistance device, in communication with a ground station.

The processing unit 12 of the pilot assistance device 10 is also configured for communicating with a ground station 30 via a link between the ground station and the pilot assistance device 10, as shown in FIG. 3. The ground station 30 corresponds for example to a support center of the manufacturer of the aircraft 1 or to an operational center of an airline company using the aircraft 1. The ground station 30 comprises a memory or a database 32 in which behavioral information relating to the aircraft 1 is recorded. In particular, this behavioral information corresponds to at least one model of behavior of the aircraft. Such a behavior model relates for example to the flight domain of the aircraft (limiting speeds, limits of angles of attack or of roll angles, etc.) or to performance characteristics of the aircraft (fuel consumption, takeoff or braking distances, maximum takeoff thrust, optimum cruising speed, etc.). Advantageously, the ground station 30 is configured for receiving information from one or more information sources 31a, 31b . . . 31n. The information able to be supplied to the ground station 30 by the information sources 31a, 31b . . . 31n corresponds for example, in a non-limiting manner, to a flight plan of the aircraft 1, to one or more decision trees corresponding to procedures (or "checklists") that need to be followed by a pilot of the aircraft, to previous flight parameters of the aircraft, to environmental information such as the meteorology or the state of a runway, etc.

In operation, when the pilot assistance device 10 is taken on board an aircraft 1 by the pilot, a communications link is established between the pilot assistance device 10 and the communications unit 22 of the aircraft. This communications link is for example of the WiFi type. According to one alternative, the establishment of the said communications link is carried out on the initiative of the pilot. According to another alternative, the establishment of the said communications link is carried out automatically, by virtue of an automatic recognition protocol. Once the link has been established, the communications unit 22 transmits flight parameters of the aircraft to the pilot assistance device 10. The transmission of the flight parameters of the aircraft to the pilot assistance device 10 is carried out during all or part of the flight phases of the aircraft (such as for example taxiing, takeoff, climbing flight, cruising flight, descending flight, landing). The flight parameters are received by the processing unit 12 which records these flight parameters in the memory 14 of the pilot assistance device 10. For example, the flight parameters are more particularly recorded in the memory 14a. Advantageously, the transmission and the recording of the flight parameters are carried out repeatedly during the said flight phases of the aircraft.

Outside of the flight phases of the aircraft 1, when the pilot and the pilot assistance device 10 are on the ground, for example before a flight or following a flight of the aircraft 1, the pilot formulates a request by means of the device 10 in such a manner as to establish a communications link between the ground station 30 and the pilot assistance device 10. This communications link is for example of the WiFi type. Once the liaison has been established, the ground station 30 transmits behavioral information relating to the aircraft 1 to the pilot assistance device 10. This behavioral information corresponds to at least one model of behavior of the aircraft. According to one alternative, the choice of the behavioral information to be transmitted to the pilot assistance device 10 is communicated to the ground station 30 in a request sent by the pilot assistance device 10. According to another alternative, the choice of the behavioral information to be transmitted to the pilot assistance device 10 is preset in the ground station 30. The behavioral information relating to the aircraft is received by the processing unit 12 which records this behavioral information in the memory 14 of the pilot assistance device 10. For example, the behavioral information is more particularly recorded in the memory 14b. Advantageously, aside from the behavioral information, the ground station 30 may send other information relating to the flight of the aircraft 1 to the pilot assistance device 10, such as for example information relating to the flight plan of the aircraft, environmental information, etc.

A first mode of use of the pilot assistance device 10 corresponds to a use on the ground, after a flight of the aircraft 1. In such a case, the transmission of the behavioral information of the aircraft 1 by the ground station 30 to the pilot assistance device 10 may be carried out either before or after the flight of the aircraft. The pilot assistance device 10 comprises one or more software applications designed to exploit the flight parameters recorded in the memory 14. A software application compares at least a part of the flight parameters recorded in the memory 14a with a model of behavior of the aircraft corresponding to at least a part of the behavioral information recorded in the memory 14b. Depending on the comparison of the flight parameters with the model of behavior of the aircraft, the software application determines an indicator of the quality of flying of the aircraft and it sends a command to display the flying quality indicator, in particular on a display of the pilot assistance device 10. Advantageously, the software application furthermore determines an action of the pilot which would have allowed the flying quality indicator to be optimized and it sends a command to display a recommendation corresponding to the said action of the pilot.

Thus, the pilot assistance device 10 allows the pilot to obtain one or more flying quality indicators relating to a flight of the aircraft, and also potentially associated recommendations. When the memory of the pilot assistance device 10 contains flight parameters relating to several flights carried out by the pilot, on one or more aircraft, the pilot can thus obtain these flying quality indicators, and potentially these recommendations, for each of the said flights. This allows the pilot to compare his/her flying quality indicators, and potentially the associated recommendations, relating to several flights, in such a manner as to be able to appreciate whether he/she needs to improve certain aspects of his/her flying. This may lead to him/her choosing to undertake a training course in order to improve the said aspects of his/her flying.

In a first example, a software application of the pilot assistance device 10 is provided for determining a flying quality indicator relating to the fuel consumption of the aircraft as a function of an altitude profile corresponding to the flight in question of the aircraft. For this purpose, the flight parameters, previously recorded in the memory 14a, taken into account by the software application are parameters relating to the altitude of the aircraft during the flight, together with parameters relating to the fuel consumption of the aircraft. The behavioral information used by the software application, previously recorded in the memory 14b, corresponds to a model of behavior of the aircraft relating notably to the fuel consumption as a function of the cruising altitude. On the basis of the said model, the software application calculates an optimum fuel consumption corresponding to a cruising altitude of the aircraft that is optimal in terms of fuel consumption. The software application subsequently compares this optimum fuel consumption with the real fuel consumption during the flight, corresponding to the flight parameters recorded in the memory 14a, in such a manner as to calculate a flying quality indicator corresponding for example to a ratio between the optimum fuel consumption and the real fuel consumption. The software application sends a command to display the flying quality indicator on the display screen of the pilot assistance device 10. Advantageously, the software application furthermore determines an action of the pilot which would have allowed the flying quality indicator to be optimized. In the example being considered, this action of the pilot corresponds to the selection of a cruising altitude corresponding to the said cruising altitude of the aircraft that is optimal in terms of fuel consumption. The software application sends a command to display, on a display screen of the pilot assistance device 10, a recommendation corresponding to the said action of the pilot, for example "Recommended cruising altitude: xxx meters".

In a second example, a software application of the pilot assistance device 10 is provided for determining a flying quality indicator relating to the fuel consumption of the aircraft as a function of the moment of deployment of the landing gear during a runway approach phase. For this purpose, the flight parameters, previously recorded in the memory 14a, taken into account by the software application are parameters relating to the altitude of the aircraft during the approach phase, parameters relating to a moment of deployment of the landing gear, together with parameters relating to the thrust of the engines during the approach phase. The behavioral information used by the software application, previously recorded in the memory 14b, corresponds to a model of behavior of the aircraft relating notably to the loss of altitude of the aircraft as a function of its aerodynamic configuration. On the basis of the said model, the software application determines an optimum moment of deployment of the landing gear allowing the thrust of the engines of the aircraft to be minimized during the approach phase. The software application subsequently compares this optimum moment of deployment of the landing gear with the actual moment of deployment of the landing gear corresponding to the flight parameters recorded in the memory 14a. If the difference between the two times is greater than a predetermined threshold, for example 5 seconds, the software application calculates the integral of the thrust of the engines of the aircraft during the approach phase carried out and during the optimum approach phase, in such a manner as to determine a fuel consumption during the actual approach phase and a fuel consumption during the optimum approach phase. The software application calculates the difference between these two fuel consumptions, corresponding to an over-consumption owing to the deployment of the landing gear at a non-optimal moment in time. The software application then sends a command to display, on the display screen of the pilot assistance device 10, a flying quality indicator corresponding to this fuel over-consumption. Advantageously, the software application calculates the time difference Δt between the optimum moment of deployment of the landing gear and the actual moment of deployment of the landing gear. The software application subsequently sends a command to display, on a display screen of the pilot assistance device 10, a recommendation corresponding to an action of the pilot, for example "Deploy the landing gear Δt seconds later".

In one advantageous embodiment, aside from the determination of at least one flying quality indicator and potentially of an associated recommendation, the pilot assistance device 10 comprises a software application, executable after a flight of the aircraft, which analyses the recorded flight parameters and which determines as a consequence virtual reality images corresponding to the history of the flight for which the flight parameters have been recorded. The pilot assistance device 10 sends a command to display the said images on a virtual reality display device, for example a virtual reality headset or glasses. Associated with the flying quality indicator and with the associated recommendation, these images allow the pilot to better understand which aspects of the quality of his/her flying technique were not optimal and how he/she could improve them. Advantageously, the software application furthermore determines virtual reality images corresponding to an optimized flight from the point of view of a flying quality indicator being considered and it sends a command to display the said images. The pilot can thus see the actions that he/she should have carried out and at which moments in time he/she should have performed these actions.

A second mode of use of the pilot assistance device 10 corresponds to a use during a flight of the aircraft 1. In such a case, the transmission of the behavioral information of the aircraft 1 by the ground station 30 to the pilot assistance device 10 is preferably carried out prior to this flight of the aircraft. However, in one particular embodiment, this transmission may be carried out via a data link between the ground station 30 and the aircraft 1. The pilot assistance device 10 then receives the behavioral information via the link between the communications unit 22 of the aircraft and the pilot assistance device 10.

This second mode of use allows the pilot of the aircraft to verify, during the flight, certain quality indicators relating to his/her flying, so as to improve his/her performance. Thus, the indicator calculated in the aforementioned first example, together with the associated cruising altitude recommendation, allows the pilot to optimize the cruising altitude of the aircraft during a cruising flight phase.

Advantageously, at least during the flight of the aircraft 1, the pilot is equipped with a portable personal device, distinct from the pilot assistance device 10. This portable personal device is designed to acquire physical parameters of the pilot. These physical parameters are for example parameters relating to the sleep pattern of the pilot, to his/her pulse rate, to his/her stress level, etc. The portable personal device corresponds for example to a connected watch, capable of communicating with the pilot assistance device 10, in particular via a link of the WiFi or Bluetooth type. In a repeated manner during the flight of the aircraft 1, the portable personal device acquires physical parameters of the pilot and transmits these physical parameters over the said link. The pilot assistance device 10 receives these physical parameters and records them in the memory 14a with the flight parameters. The recording of the physical parameters of the pilot allows them to be used by a software application of the pilot assistance device 10, after the flight of the aircraft, in order to determine a correlation between flying performance of the pilot, corresponding to one or more flying quality indicators, and a physical state of the pilot represented by these physical parameters of the pilot. On the other hand, the recording of the physical parameters of the pilot allows their use by a software application of the pilot assistance device 10, during the flight of the aircraft, for determining a notification to be sent to the pilot as a function of at least a part of the said physical parameters and, potentially, of flight parameters of the aircraft. The software application sends the notification thus determined to the portable personal device of the pilot (for example a connected watch) which implements this notification. Alternatively, the notification may be directly implemented by the pilot assistance device 10, for example by displaying a message on a display screen of the said pilot assistance device 10 and/or by emitting an audible signal. In one particular example of the use of the physical parameters of the pilot by a software application during the flight of the aircraft, these physical parameters relate to the sleep pattern of the pilot. When the aircraft is in an automatic pilot mode during a cruising flight phase and when the software application determines a sleeping phase of the pilot on the basis of the physical parameters of the pilot, the software application does not send any notification to the pilot because no particular action of the pilot is required in such a flight phase. When the software application determines, by analyzing the flight parameters of the aircraft, that an action by the pilot is required, or will soon be required, the software application determines a notification to be sent to the pilot, so as to wake up the pilot in order for him/her to be able to carry out the said required action. Where possible, the software application sends the notification early enough so as to wake up the pilot a predetermined time before the implementation of the required action. This allows the pilot to be completely awake when he/she executes the said action. One example of a situation in which the software application can anticipate the sending of the notification corresponds to the end of the cruising phase. The required time for ending the cruising phase and beginning a descent phase may be determined in advance by the software application as a function, on the one hand, of current flight parameters of the aircraft received by the pilot assistance device 10 and recorded in the memory 14a and, on the other hand, of a model of performance of the aircraft, recorded in the memory 14b, relating to the aerodynamic performance characteristics of the descending aircraft.

In one particular embodiment, decision information relating to the aircraft 1 is recorded in the memory or in the database 32 of the ground station 30. This decision information comprises at least one decision tree corresponding to procedures (or "checklists") to be followed by a pilot of the aircraft. When a communications link is established between the ground station 30 and the pilot assistance device 10, the ground station transmits this decision information over this communications link. The processing unit 12 of the pilot assistance device 10 receives this decision information and records it in the memory 14 of the pilot assistance device 10, in particular in the part 14b of the memory 14. During the flight of the aircraft, a software application of the pilot assistance device 10 determines whether a predetermined event has occurred, as a function of at least a part of the flight parameters recorded in the memory and of at least a part of the decision information recorded in the memory. In particular, the predetermined event corresponds to the non-implementation of an expected action by the pilot. For example, when the pilot executes a procedure, corresponding to a decision tree recorded in the memory 14b, the software application analyses the flight parameters received by the pilot assistance device 10 so as to determine whether the pilot has forgotten to execute an action included in the said procedure. In such a case, the software application, executed by the processing unit 12, causes the generation of a notification on a portable device that is independent of the pilot assistance device 10. This allows the pilot to be warned of the oversight of execution of the said action. Preferably, although not obligatorily, the portable device is the same device as the portable personal device used for the acquisition of physical parameters of the pilot (for example a connected watch) when the pilot is equipped with such a portable personal device. In particular again, the predetermined event corresponds to the occurrence of an environmental condition (for example a turbulence event) or to the occurrence of a physical condition of the pilot (for example falling asleep or the exceeding of a level of stress). In the case where the predetermined event corresponds to the occurrence of an environmental condition, the software application determines the occurrence of the said predetermined event by analyzing the flight parameters of the aircraft recorded in the memory of the pilot assistance device 10. In the case where the predetermined event corresponds to the occurrence of a physical condition of the pilot, the software application determines the occurrence of the said predetermined event by analyzing the physical parameters of the pilot recorded in the memory of the pilot assistance device 10. Thus, by analyzing the flight parameters of the aircraft and the physical parameters of the pilot recorded in the memory of the pilot assistance device 10, the software application determines the potential occurrence of a predetermined event and, in such a case, it causes the generation of a notification on the portable device of the pilot.

In one particular embodiment, when a communications link is established between the ground station 30 and the pilot assistance device 10, the processing unit 12 of the pilot assistance device 10 transmits to the ground station 30 at least a part of the flight parameters of the aircraft and/or of the physical parameters of the pilot recorded in the memory 14 of the pilot assistance device 10. The transmission of the said parameters to the ground station is for example triggered by a voluntary action of the pilot by means of a suitable software application of the pilot assistance device 10. Advantageously, the pilot can select, by means of the said software application, the parameters that he/she wishes to transmit to the ground station 30.

Embodiments of the invention have been illustrated and described. It should be noted that other modifications, substitutions and alternatives will occur to the person skilled in the art and may be changed without departing from the scope of the subject matter described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pilot assistance device for assisting a pilot of an aircraft, the pilot assistance device comprising:
   a processing unit and a memory, wherein the processing unit is configured to:
   during at least one flight phase of the aircraft, acquire flight parameters of the aircraft, transmitted by a communications unit of the aircraft via a communications link between the communications unit and the pilot assistance device and record the flight parameters in the memory of the pilot assistance device;
   acquire physical parameters of the pilot, transmitted by a portable personal device that is independent of the pilot assistance device via a communications link between the portable personal device and the pilot assistance device, and record the physical parameters of the pilot in the memory of the pilot assistance device,
   wherein the portable personal device is either a handheld device or a device worn on the wrist of the pilot;
   acquire behavioral information corresponding to at least one model of behavior of the aircraft, transmitted by a ground station via a communications link between the ground station and the pilot assistance device and record this behavioral information in the memory of the pilot assistance device,
   wherein the pilot assistance device is a portable device that is independent of avionics systems of the aircraft;
   determine at least one indicator of a quality of flying of the aircraft as a function of at least a portion of the flight parameters recorded in the memory and of at least a portion of the behavioral information recorded in the memory, wherein the processing unit is configured to determine an action of the pilot which would have allowed the at least one indicator of a quality of flying to be optimized and to control display of a recommendation corresponding to the action of the pilot, such that the pilot is only able to review the recommendation after a flight of the aircraft; and control a display of the said at least one flying quality indicator.

2. The pilot assistance device according to claim 1, wherein the processing unit is configured to determine the at least one indicator of a quality of flying by comparison of the portion of the flight parameters recorded in the memory with one of the models of behavior of the aircraft corresponding to the portion of the behavioral information recorded in the memory.

3. The pilot assistance device according to claim 1, wherein the processing unit is configured to:

acquire decision information corresponding to at least one decision tree, transmitted by the ground station via the link between the ground station and the pilot assistance device, and record the decision information in the memory of the pilot assistance device;

determine whether a predetermined event has occurred, as a function of the at least a portion of the flight parameters recorded in the memory and of at least a portion of the decision information recorded in the memory; and, cause a generation of a notification on a portable device that is independent of the pilot assistance device, if the predetermined event has occurred.

4. The pilot assistance device according to claim 3, wherein the event corresponds to one of the following events:

an occurrence of an environmental condition;

an occurrence of a physical condition of the pilot; or a non-implementation of an expected action of the pilot.

5. The pilot assistance device according to claim 1, wherein the processing unit is configured to transmit the flight parameters recorded in the memory of the pilot assistance device to the ground station, via the communications link between the ground station and the pilot assistance device.

6. A system for assisting a pilot of an aircraft comprising:

the pilot assistance device according to claim 1;

the communications unit in the aircraft; and, the ground station configured to transmit behavioral information corresponding to at least one model of behavior of the aircraft.

7. A method for assisting a pilot of an aircraft, wherein the method comprises the following steps implemented by a processing unit of a pilot assistance device:

during at least one flight phase of the aircraft, acquiring flight parameters of the aircraft, transmitted by a communications unit of the aircraft via a communications link between the communications unit and the pilot assistance device, and recording these flight parameters in a memory of the pilot assistance device, wherein the pilot assistance device is a portable device that is independent of avionics systems of the aircraft;

acquiring behavioral information corresponding to at least one model of behavior of the aircraft, transmitted by a ground station via a communications link between the ground station and the pilot assistance device, and recording this behavioral information in the memory of the pilot assistance device;

acquire physical parameters of the pilot, transmitted by a portable personal device that is independent of the pilot assistance device via a communication link between the portable personal device and the pilot assistance device, and record the physical parameters of the pilot in the memory of the pilot assistance device, wherein the portable personal device is either a handheld device or a device worn on the wrist of the pilot;

determining at least one indicator of a quality of flying of the aircraft as a function of at least a portion of the flight parameters recorded in the memory and of at least a portion of the behavioral information recorded in the memory, wherein the processing unit is configured to determine an action of the pilot which would have allowed the at least one indicator of a quality of flying to be optimized and to control display of a recommendation corresponding to the action of the pilot, such that the pilot is only able to review the recommendation after a flight of the aircraft; and controlling a display of the at least one indicator of a quality of flying of the aircraft.

8. A non-volatile medium readable by a pilot assistance computer, wherein the medium stores instructions which, when executed by a processing unit of the computer, cause the processing unit of the computer to implement the following steps:

during at least one flight phase of the aircraft, acquiring flight parameters of the aircraft, transmitted by a communications unit of the aircraft via a communications link between the communications unit and the pilot assistance computer, and recording these flight parameters in a memory of the pilot assistance computer, wherein the pilot assistance computer is a portable device that is independent of avionics systems of the aircraft;

acquiring behavioral information corresponding to at least one model of behavior of the aircraft, transmitted by a ground station via a communications link between the ground station and the pilot assistance computer, and recording this behavioral information in the memory of the pilot assistance computer;

acquire physical parameters of the pilot, transmitted by a portable personal device that is independent of the pilot assistance device via a communications link between the portable personal device and the pilot assistance device, and record the physical parameters of the pilot in the memory of the pilot assistance device, wherein the portable personal device is either a handheld device or a device worn on the wrist of the pilot;

determining at least one indicator of the quality of flying of the aircraft as a function of at least a portion of the flight parameters recorded in the memory and of at least a portion of the behavioral information recorded in the memory, wherein the processing unit is configured to determine an action of the pilot which would have allowed the at least one indicator of a quality of flying to be optimized and to control display of a recommendation corresponding to the action of the pilot, such that the pilot is only able to review the recommendation after a flight of the aircraft; and controlling a display of the at least one indicator of the quality of flying of the aircraft.

\* \* \* \* \*